US012256208B2

(12) United States Patent
O'Brien

(10) Patent No.: US 12,256,208 B2
(45) Date of Patent: Mar. 18, 2025

(54) LOUDSPEAKER TRANSDUCERS

(71) Applicant: Polk Audio, LLC, Carlsbad, CA (US)

(72) Inventor: Sean O'Brien, Carlsbad, CA (US)

(73) Assignee: POLK AUDIO, LLC, Carlsbad, CA (US)

( * ) Notice: Subject to any disclaimer, the term of this patent is extended or adjusted under 35 U.S.C. 154(b) by 113 days.

(21) Appl. No.: 17/828,792

(22) Filed: May 31, 2022

(65) Prior Publication Data

US 2023/0388717 A1 Nov. 30, 2023

(51) Int. Cl.

| | |
|---|---|
| ***H04R 9/06*** | (2006.01) |
| ***H04R 7/12*** | (2006.01) |
| ***H04R 7/18*** | (2006.01) |
| ***H04R 9/02*** | (2006.01) |
| ***H04R 9/04*** | (2006.01) |
| ***H04R 31/00*** | (2006.01) |

(52) U.S. Cl.

CPC ................. *H04R 9/06* (2013.01); *H04R 7/12* (2013.01); *H04R 7/18* (2013.01); *H04R 9/025* (2013.01); *H04R 9/04* (2013.01); *H04R 31/003* (2013.01); *H04R 31/006* (2013.01); *H04R 2400/11* (2013.01)

(58) Field of Classification Search

CPC ... H04R 9/06; H04R 7/12; H04R 7/18; H04R 9/025; H04R 9/04; H04R 31/003; H04R 31/006; H04R 2400/11

USPC ....... 381/398, 423, 424, 335, 404, 405, 345, 381/186; 181/157, 171, 172

See application file for complete search history.

(56) References Cited

U.S. PATENT DOCUMENTS

| | | | | |
|---|---|---|---|---|
| 6,747,395 | B1 * | 6/2004 | Satoh .................. | H04R 17/005 310/327 |
| 2010/0316249 | A1 * | 12/2010 | Kamimura ............ | H04R 9/043 381/399 |
| 2016/0234618 | A1 | 8/2016 | Honda et al. | |
| 2022/0322012 | A1 * | 10/2022 | Huang .................. | H04R 9/043 |

FOREIGN PATENT DOCUMENTS

| | | |
|---|---|---|
| WO | 2018220054 A1 | 12/2018 |

* cited by examiner

*Primary Examiner* — Norman Yu

(74) *Attorney, Agent, or Firm* — Nieves IP Law Group, LLC; Peter A. Nieves

(57) ABSTRACT

The present disclosure relates to a loudspeaker transducer comprising a diaphragm (112), a frame (120), an inner suspensions element (118) and an outer suspension element (110). The diaphragm (112) comprises a portion turning inwards (102) towards the frame (120). The outer suspension element (110) is located closer than the inner suspension element (118) to the main opening of the frame through which the loudspeaker transducer radiates sound. The inner suspension element (118) is connected to the frame (120) and the inward turning portion (102). The inner suspension element (118) is connected to the inward turning portion (102) at an outer end (203) of the diaphragm.

17 Claims, 13 Drawing Sheets

LOUDSPEAKER TRANSDUCERS

TECHNICAL FIELD

The present disclosure concerns loudspeaker transducers. More particularly, but not exclusively, the present disclosure concerns loudspeaker transducers comprising a diaphragm with an inward turning portion.

DESCRIPTION OF THE RELATED TECHNOLOGY

A conventional loudspeaker transducer generates sound by driving a diaphragm up and down along a central axis, while the diaphragm is supported by one or more suspension elements that act to reduce vibrations/movement in other directions. A typical loudspeaker transducer has a voice coil which is affixed to the center of a frusto-conical diaphragm. The diaphragm (or 'cone' or 'sound radiator') is attached at its outermost edge to the inner edge of an outer suspension element (or 'surround'). The outer suspension element is attached at its outer edge to a rigid frame (or 'basket'). The voice coil is attached to the diaphragm and also to an inner suspension element (typically called a 'spider') which acts to keep the voice coil centered on its axis as it oscillates. The outer edge of the spider is connected to the rigid frame. The frame also typically houses a magnet structure which is fixed centrally in relation to the rigid frame. The magnet structure and the voice coil are commonly referred to as the motor. The diaphragm and voice coil are elastically supported by the frame so that they are able to move back and forth along the central axis while the frame and magnet structure remain fixed in place. A dust cap is commonly fixed above the hole in the center of the diaphragm to stop dust from entering into the magnet structure. The displacement of the diaphragm from a neutral position is known as its excursion. In loudspeaker transducers that produce lower frequencies, a relatively large excursion is required, in comparison to the typical excursions of higher frequency loudspeaker transducers, for the required frequencies of sound waves to be produced at a particular desired acoustic output level. A loudspeaker transducer should provide sufficient space around the diaphragm in order for the required peak-to-peak excursion of the diaphragm to be possible without colliding with other parts of the loudspeaker transducer. Loudspeaker transducers that produce low frequencies ('woofers' or 'subwoofers') are often required to be fitted into sound bars and other enclosures that require them to have a shallower depth than they would ordinarily. Loudspeaker transducers with typical frusto-conical cones having the required space for excursion are therefore limited as to how much the depth of the loudspeaker transducer can be reduced before sound quality will be impacted. There is therefore a need for improved loudspeaker transducer designs, particularly where overall speaker dimensions are limited.

The present disclosure seeks to mitigate the above-mentioned problems. Alternatively or additionally, the present disclosure seeks to provide improved loudspeaker transducers.

SUMMARY

A first aspect of the present disclosure relates to a loudspeaker transducer comprising a diaphragm, a frame, an inner suspension element and an outer suspension element, wherein: the diaphragm comprises a portion turning inwards towards the frame, the outer suspension element is located closer than the inner suspension element to the main opening of the frame through which the loudspeaker radiates sound, the inner suspension element is connected to the frame and the inward turning portion, and the inner suspension element is connected to the inward turning portion at an outer end of the diaphragm.

A second aspect of the present disclosure relates to a method of manufacturing a loudspeaker transducer comprising a diaphragm, a frame, an inner suspension element and an outer suspension element, the method comprising: forming the diaphragm with a portion turning inwards towards the frame, and attaching the inner suspension element to the frame and the inward turning portion at an outer end of the diaphragm. The inner suspension element is attached to the frame and the diaphragm such that it is further away than the outer suspension element to the main opening of the frame through which the loudspeaker transducer radiates sound.

A third aspect of the present disclosure relates to a method of manufacturing a loudspeaker transducer, the method comprising: forming a diaphragm; forming a first frame part; forming a suspension element; forming a second frame part; attaching a suspension element to the first frame part; attaching the diaphragm to the suspension element, wherein the diaphragm comprises an inward turning portion which turns inwards towards the first frame part and the suspension element attaches to the inward portion at an outer edge of the diaphragm; and attaching the second frame part to the first frame part.

It will of course be appreciated that features described in relation to one aspect of the present disclosure may be incorporated into other aspects of the present disclosure. For example, the method of the present disclosure may incorporate any of the features described with reference to the apparatus of the present disclosure and vice versa.

DETAILED DESCRIPTION OF CERTAIN INVENTIVE EMBODIMENTS

Figure 1:
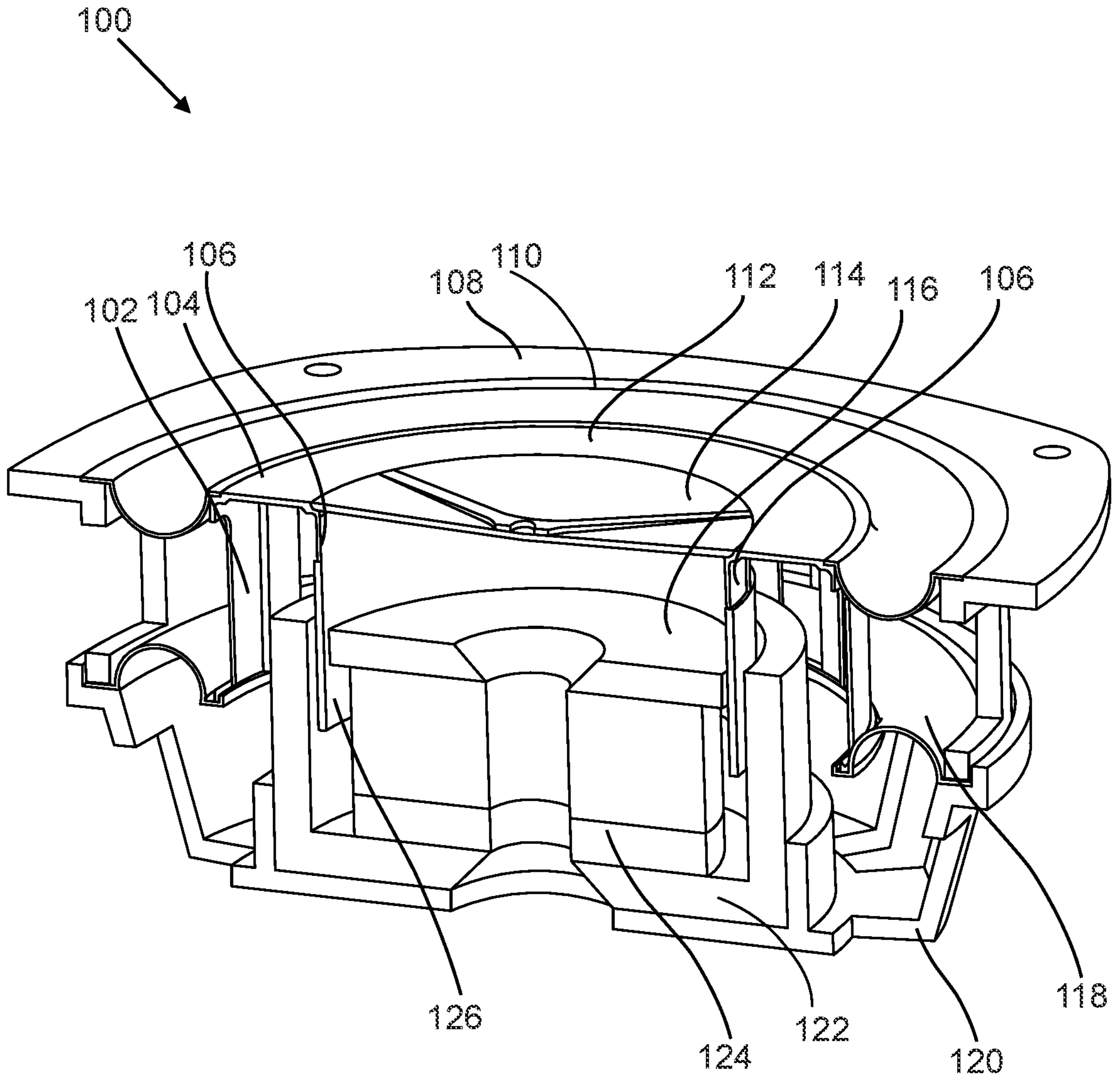
FIG. 1 is a perspective view of a loudspeaker transducer according to embodiments of the present disclosure.
Figure 2:
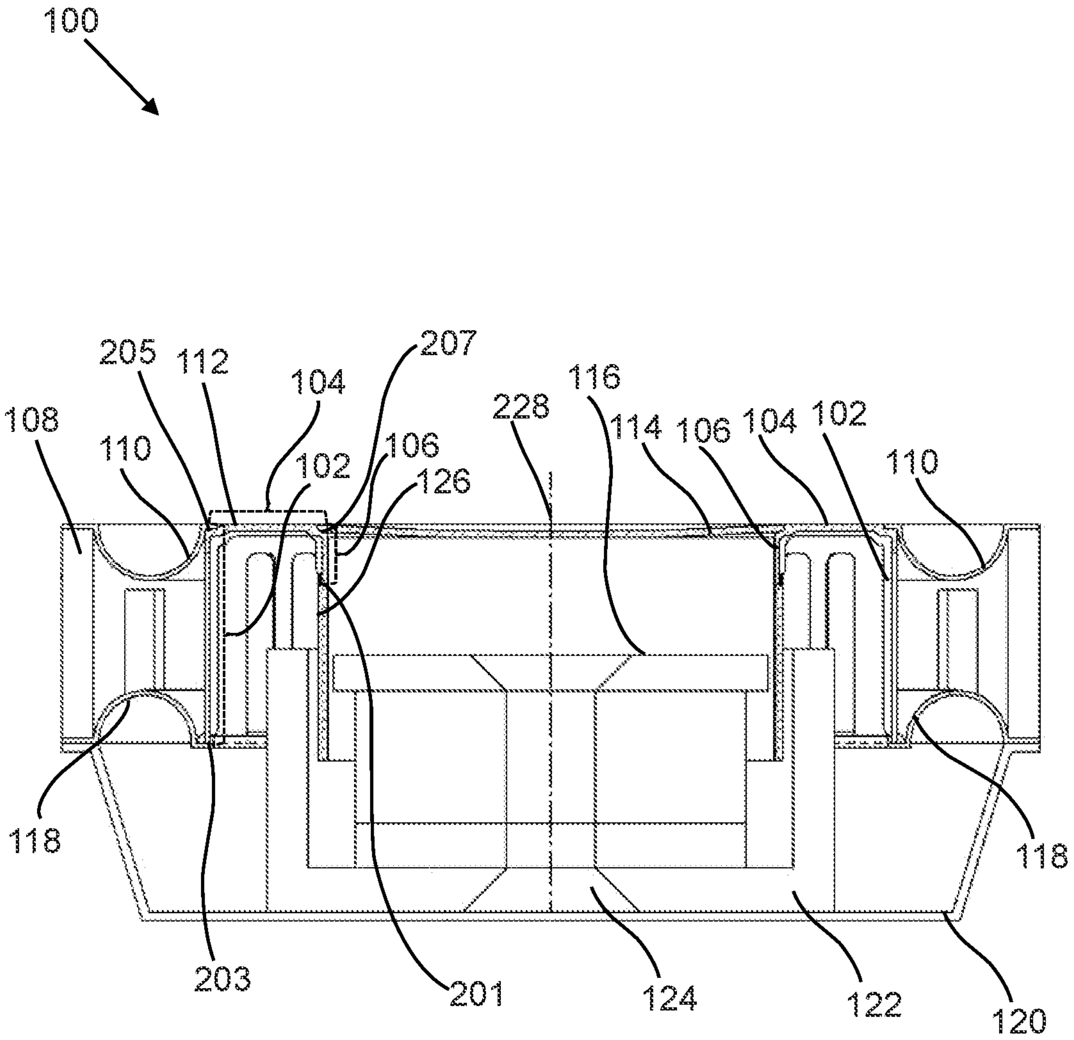
FIG. 2 shows the loudspeaker transducer of FIG. 1 from a cross-sectional side view according to embodiments of the present disclosure.

FIG. 1 shows a perspective view of a loudspeaker transducer 100 according to embodiments of the present disclosure. Loudspeaker transducer 100 comprises a frame 120, a magnet structure 124, a voice coil 126, a diaphragm 112, an inner suspension element 118, an outer suspension element 110 and a dust cap 114. FIG. 2 shows loudspeaker transducer 100 of FIG. 1 from a cross-sectional side view. Magnet structure 124 is attached to frame 120 centrally within loudspeaker transducer 100. A central axis 228 of magnet structure 124 is represented as a dashed line in FIG. 2. Diaphragm 112 is arranged such that it is centred on central axis 228 and attached to voice coil 126 such that voice coil 126 is centred on central axis 228. In embodiments, inner suspension element 118 has a semi-circular cross section which is convex in relation to frame 120. Inner suspension element 118 has a connection on one side to frame 120 and on its other side to diaphragm 112. In embodiments, outer suspension element 110 has a semi-circular cross-section which is concave in relation to frame 120. Outer suspension element 110 has a connection on one side to frame 120 and on its other side to diaphragm 112. Inner suspension element 118 and outer suspension element 110 are aligned in the direction of central axis 228. In embodiments (not shown), inner suspension element 118 and outer suspension element 110 have a corrugated cross-section. In embodiments (not shown), inner suspension element 118 and outer suspension element 110 have different cross-sectional profiles.

Embodiments relate to loudspeaker transducer 100 comprising diaphragm 112, frame 120, and inner suspension element 118. Diaphragm 112 comprises a portion 102 turning inwards towards the frame 120. Inner suspension element 118 is connected to frame 120 and inward turning portion 102. Inner suspension element 118 is connected to inward turning portion 102 at an outer end 203 of diaphragm 112. In embodiments, inward turning portion 102 is connected at outer end 203 to inner suspension element 118 and is connected at an outer edge 205 (or 'shoulder') of diaphragm 112 to a further portion 104 of diaphragm 112. Further portion 104 is attached at outer edge 205 to outer suspension element 110 and at an inner edge 207 (or 'shoulder') of diaphragm 112 to an inner portion 106 of diaphragm 112. In embodiments, diaphragm 112 comprises inner portion 106 and inner portion 106 comprises an inner end 201 of diaphragm 112.

Figure 3:
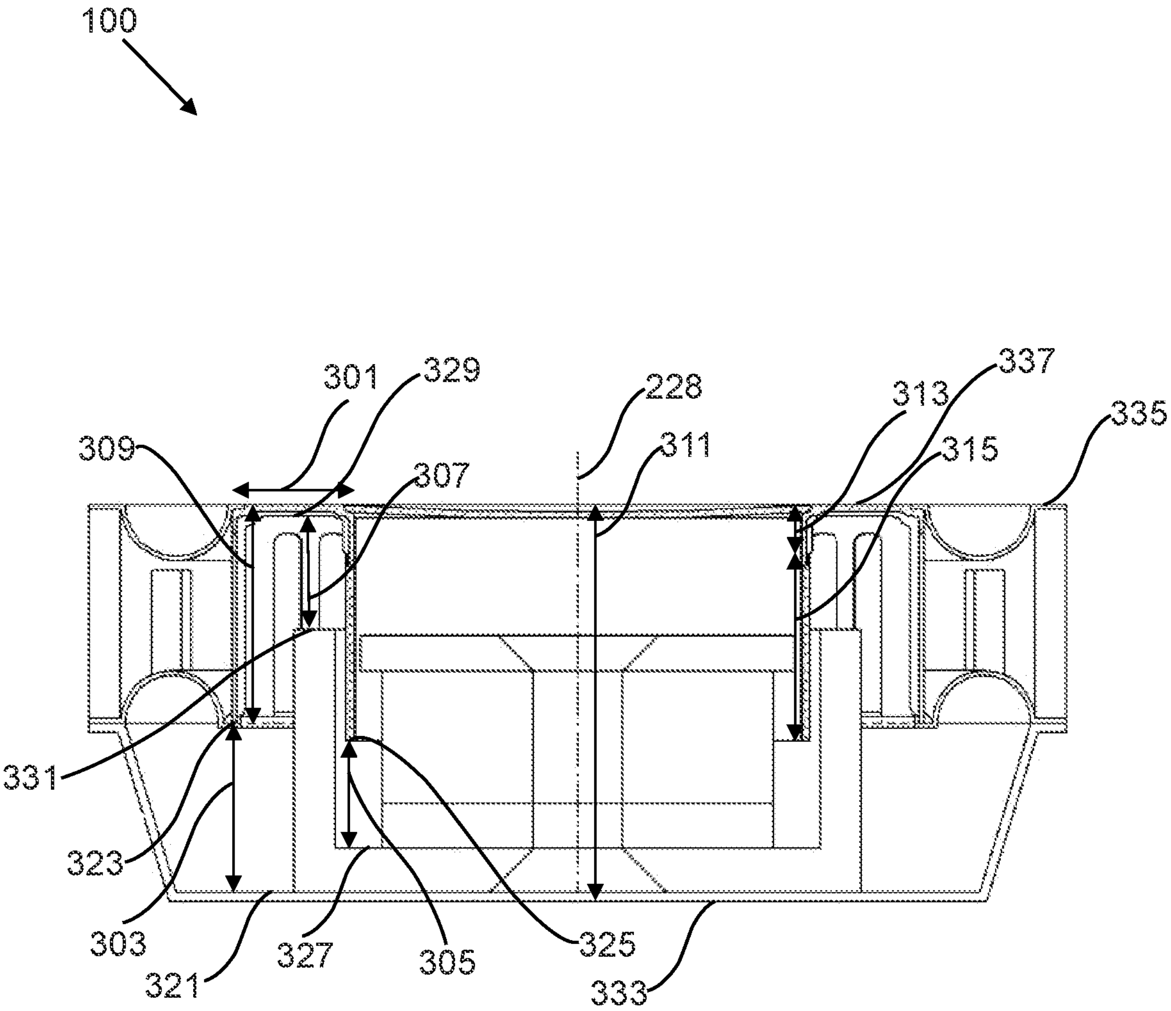
FIG. 3 shows the loudspeaker transducer of FIG. 1 from a cross-sectional side view according to embodiments of the present disclosure.

FIG. 3 shows loudspeaker transducer 100 from a cross-sectional side view. A first length 301 is the distance from outer edge 205 to inner edge 207 of diaphragm 112 in a direction perpendicular to central axis 228.

A second length 303 is the distance between an upward facing internal surface 321 of frame 120 and outer end 203 of diaphragm 112 along the direction of central axis 228. The term upward facing is used here to refer to a direction along central axis 228 away from frame 120 and towards dust cap 114. Upward facing internal surface 321 of frame 120 is perpendicular to central axis 228.

A third length 305 is the distance between a lower end 325 of voice coil 126 and an internal surface 327 of magnet structure 124 along the direction of central axis 228. Internal surface 327 is perpendicular to central axis 228. Lower end 325 of voice coil 126 is the end of voice coil 126 closest to frame 120 and furthest from dust cap 114 along the direction of central axis 228.

A fourth length 307 is the distance between a lower surface 329 of further portion 104 of diaphragm 112 and an upper surface 331 of magnet structure 124 along the direction of central axis 228. Lower surface 329 of further portion 104 is perpendicular to central axis 228. Lower surface 329 of further portion 104 faces inwards towards upward facing internal surface 321 of frame 120. Upper surface 331 of magnet structure 124 is perpendicular to central axis 228. Upper surface 331 of magnet structure 124 is the face of magnet structure 124 closest to further portion 104 along the direction of central axis 228.

Second length 303, third length 305, and fourth length 307 each have a minimum length greater than a given maximum diaphragm excursion height in order to avoid diaphragm 112 colliding with frame 120 or magnet structure 124 during use.

A depth 311 of loudspeaker transducer 100 is the distance between an outer surface 333 of frame 120 and a top surface 335 of frame 120.

Length 313 of inner portion 106 is the distance between the top end of voice coil 126 and inner edge 207 of diaphragm 112.

Connecting inner suspension element 118 to inward turning portion 102 at outer end 203 of diaphragm 112 allows inner suspension element 118 to be positioned such that it is not above magnet structure 124 of loudspeaker transducer 100 (where 'above' is with respect to central axis 228 of magnet structure 124). Because inner suspension element 118 is positioned such that it is not above magnet structure 124, second length 303 can overlap with the depth of magnet structure 124 rather than being in addition to the magnet structure height, and depth 311 of loudspeaker transducer 100 can thus be reduced without compromising on the quality of sound produced. This allows loudspeaker transducer 100 to be of smaller depth 311 than a typical loudspeaker transducer for the same frequency range at a particular desired acoustic output level and allows loudspeaker transducer 100 to be fitted into smaller speaker enclosures such as those used in sound bars. Inner suspension element 118 acts to reduce rocking motions in diaphragm 112 that would create distortion and damage loudspeaker transducer 100. Inward turning portion 102 of diaphragm 112 allows inner suspension element 118 to be attached to diaphragm 112 at a location that provides stability against rocking motions.

In embodiments, a length 309 of inward turning portion 102 is dependent upon a desired excursion parameter of loudspeaker transducer 100. Second length 303 has a minimum length greater than a depth required to avoid a collision when diaphragm 112 is at maximum excursion. Depth 311 of loudspeaker transducer 100 is determined by second length 303 and length 309 of inward turning portion 102.

In embodiments, a length of inward turning portion 102 is dependent upon desired depth 311 of loudspeaker transducer 100. Third length 305 has a minimum length greater than the depth required to avoid a collision when diaphragm 112 is at a maximum excursion.

In embodiments, diaphragm 112 comprises further portion 104 parallel to top surface 116 of magnet structure 124. Further portion 104 of diaphragm 112 acts to extend diaphragm 112 out to a greater distance from central axis 228 of magnet structure 124. This makes it possible for inward turning portion 102 of diaphragm 112 to wrap around magnet structure 124. This allows second length 303 (second length 303 is greater than the maximum excursion height of diaphragm 112) to overlap with the height of magnet structure 124. Therefore, depth 311 of loudspeaker transducer 100 can be reduced without compromising on the quality of sound produced.

In embodiments, top surface 116 of magnet structure 124 is parallel to further portion 104 of diaphragm 112. In embodiments, inward turning portion 102 is connected to further portion 104 at an outer edge of further portion 104.

In embodiments, inner portion 106 turns inwards towards frame 120. Inner portion 106 provides a convenient location for voice coil 126 to be bonded to diaphragm 112, which improves the ease of attaching voice coil 126 to diaphragm 112. Inner portion 106 allows voice coil 126 to be positioned in an efficient location in relation to magnet structure 124.

In embodiments, inner portion 106 is parallel to inward turning portion 102. This allows diaphragm 112 to be fitted more tightly around magnet structure 124. This also allows diaphragm 112 to perform a maximum excursion without colliding with magnet structure 124.

In embodiments, inward turning portion 102 is perpendicular to further portion 104. This allows diaphragm 112 to be fitted more tightly around magnet structure 124 while still allowing diaphragm 112 to achieve the maximum excursion during use without collision.

In embodiments, loudspeaker transducer 100 comprises voice coil 126 and voice coil 126 is not connected to inner suspension element 118. Hence, inner suspension element 118 is not adjacent to magnet structure 124 as a spider would be in a typical loudspeaker transducer. Thus, the need for space between magnet structure 124 and inner suspension element 118 along central axis 228 of magnet structure 124 is reduced. This means that second length 303 (second length 303 is greater than the depth required for maximum excursion of diaphragm 112) can overlap with the height of magnet structure 124. Therefore, depth 311 of loudspeaker transducer 100 can be reduced without compromising on the quality of sound produced.

In embodiments, voice coil 126 is connected to inner end 201 of diaphragm 112. Thus, voice coil 126 is aligned centrally around central axis 228 of magnet structure 124 which allows magnet structure 124 and voice coil 126 (which together are commonly referred to as the 'motor') to provide a more uniform force across diaphragm 112 which helps avoid distortion in the sound waves produced by loudspeaker transducer 100.

In embodiments, when loudspeaker transducer 100 is not in use, voice coil 126 rests in a neutral position so that it is centred around magnet structure 124 and is partially within magnet structure 124. In embodiments, loudspeaker transducer 100 comprises outer suspension element 110 connected to frame 120 and diaphragm 112. Outer suspension element 110 increases the stability of diaphragm 112 and further reduces unwanted rocking motion or vibration in directions that could reduce the sound quality produced by loudspeaker transducer 100.

In embodiments, frame 120 has openings to allow air to pass more freely into the internal regions of loudspeaker transducer 100, which avoids large 'push-pull' pressure changes within the loudspeaker transducer during use. In embodiments, frame 120 has holes to allow air to pass more freely into and out of the internal regions of loudspeaker transducer 100, which helps avoid large pressure changes within the loudspeaker transducer during use.

Figure 4:
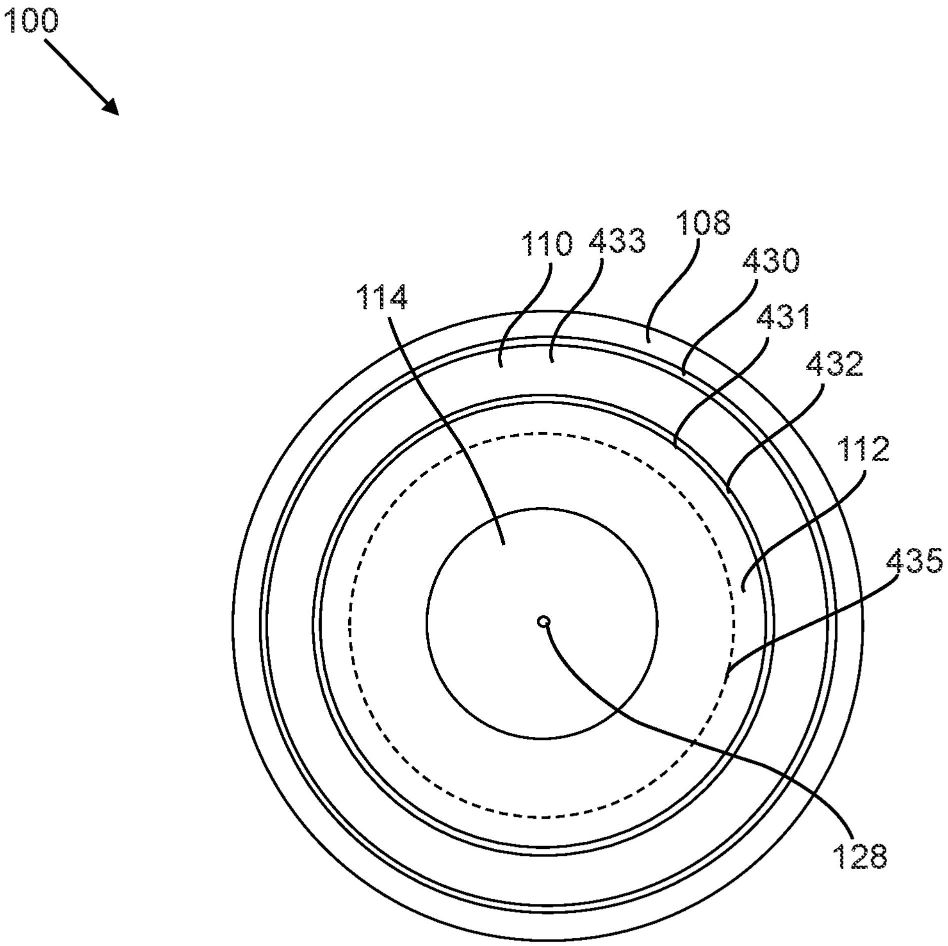
FIG. 4 shows a plan view of the loudspeaker transducer of FIG. 1 according to embodiments of the present disclosure.

FIG. 4 shows a plan view of loudspeaker transducer 100 according to embodiments of the present disclosure. In embodiments, loudspeaker transducer 100 is circular in shape and has central axis 228. Outer suspension element 110 is attached at an outer edge 430 to frame 120 and at an inner edge 432 to diaphragm 112. Outer suspension element 110 has an annular shape in plan view. Outer suspension element 110 is centred on central axis 228. Dust cap 114 has a circular shape in plan view and is centred on central axis 228. Dust cap 114 is attached at its circular outer edge to diaphragm 112. In embodiments, dust cap 114 and diaphragm 112 comprise one piece rather than two separate components.

In embodiments, magnet structure 124 is attached to frame 120. In embodiments, loudspeaker transducer 100 comprises magnet structure 124, wherein inward turning portion 102 overlaps outside a perimeter 435 of magnet structure 124 with at least part of the height of magnet structure 124. Thus, magnet structure 124, diaphragm 112 and inner suspension element 118 can occupy the same cross-sectional plane (where the cross-sectional plane is parallel to a top surface 116 of magnet structure 124). Wrapping diaphragm 112 around magnet structure 124 in this way reduces the need for space between magnet structure 124 and inner suspension element 118. This means that loudspeaker transducer 100 can have reduced depth 311 compared to what would otherwise be required, without sacrificing on space for the excursion needed to generate adequate low-frequency output.

In embodiments, outer suspension element 110 is connected to an outer edge 431 of further portion 104 of diaphragm 112. Inward turning portion 102 of diaphragm 112 has a length 309 large enough to allow inner suspension element 118 to be attached to diaphragm 112 at a distance from where outer suspension element 110 is attached that provides stability against rocking motions. In some embodiments, outer suspension element 110 comprises an unbroken surface 433 that is continuously connected to frame 120 and diaphragm 112. Hence, outer suspension element 110 acts to block dust and other debris from entering loudspeaker transducer 100. In other embodiments, inner suspension element 118 comprises a surface with at least one perforation. Hence, air is allowed to pass through inner suspension element 118. Thus, air can pass more freely into and out of the internal regions of loudspeaker transducer 100, which helps reduce pressure changes within the loudspeaker transducer during use.

In some embodiments, inner suspension element 118 is continuously connected to inward turning portion 102 along an entire outer end 203 of diaphragm 112. Continuously connecting inner suspension element 118 to inward turning portion 102 along an outer end 203 of diaphragm 112 provides uniform stability to diaphragm 112. In other embodiments, inner suspension element 118 is discontinuously connected to inward turning portion 102 at one or more parts of outer end 203 of diaphragm 112. Hence, less material is required to make inner suspension element 118. Further, air can pass through inner suspension element 118. Thus, air can pass more freely into and out of the internal regions of loudspeaker transducer 100 which helps reduce pressure changes within loudspeaker transducer 100 during use.

In embodiments, outer suspension element 110 is attached at inner edge 432 to further portion 104 of diaphragm 112 and at outer edge 430 to frame 120. Dust cap 114 is attached to diaphragm 112 centrally within loudspeaker transducer 100.

Figure 5:
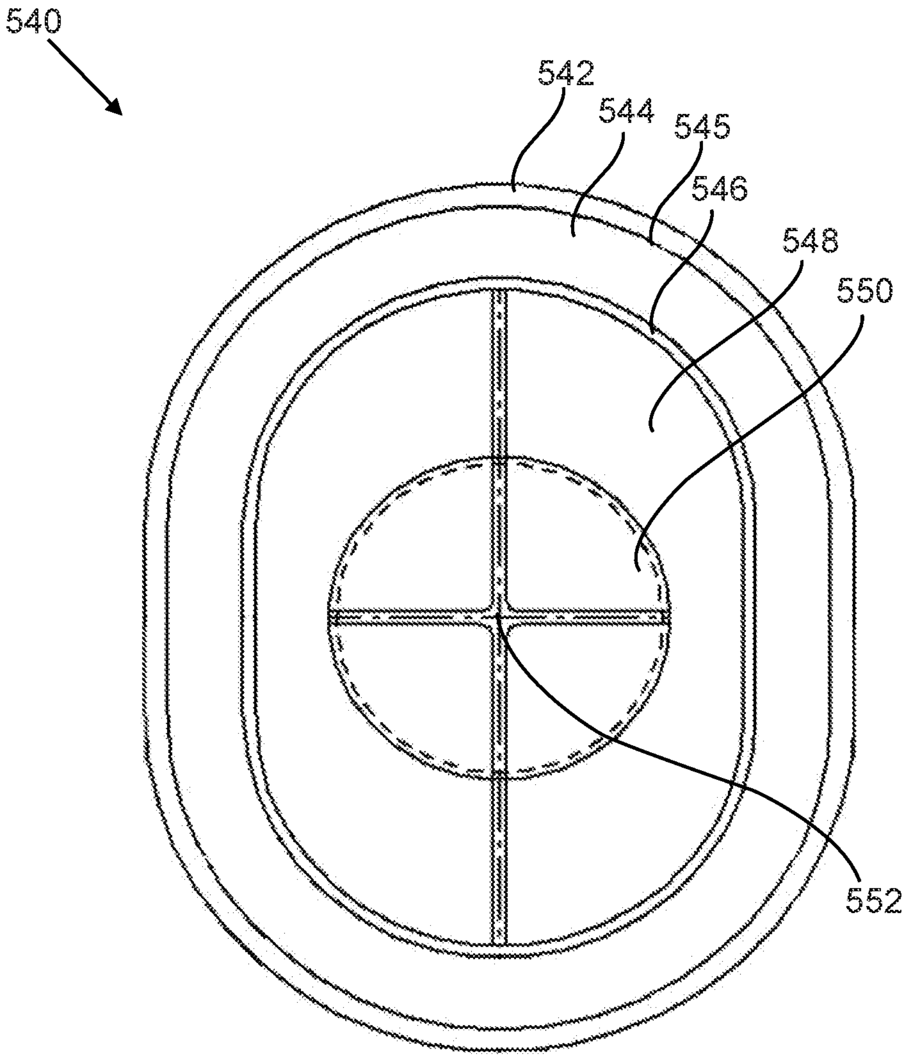
FIG. 5 shows a plan view of a loudspeaker transducer according to embodiments of the present disclosure.

FIG. 5 shows a plan view of a lozenge shaped loudspeaker transducer 540 according to embodiments of the disclosure. In embodiments, loudspeaker transducer 540 comprises a frame 542, an outer suspension element 544, a diaphragm 548, and a dust cap 550. A central axis 552 runs through the centre of loudspeaker transducer 540. Dust cap 550 is circular and is centred on central axis 552. Outer suspension element 544 has an inner edge 546 which is a lozenge shape when viewed in plan view. Outer suspension element 544 has an outer edge 545 which is a lozenge shape when viewed in plan view and which is larger than inner edge 546. Inner edge 546 and outer edge 545 are both centred on central axis 552. Frame 542 is attached to outer edge 545 of outer suspension element 544 and is centred on central axis 552. In embodiments including lozenge shaped loudspeaker transducer 540, diaphragm 548 comprises a portion turning inwards towards the frame.

Figure 6:
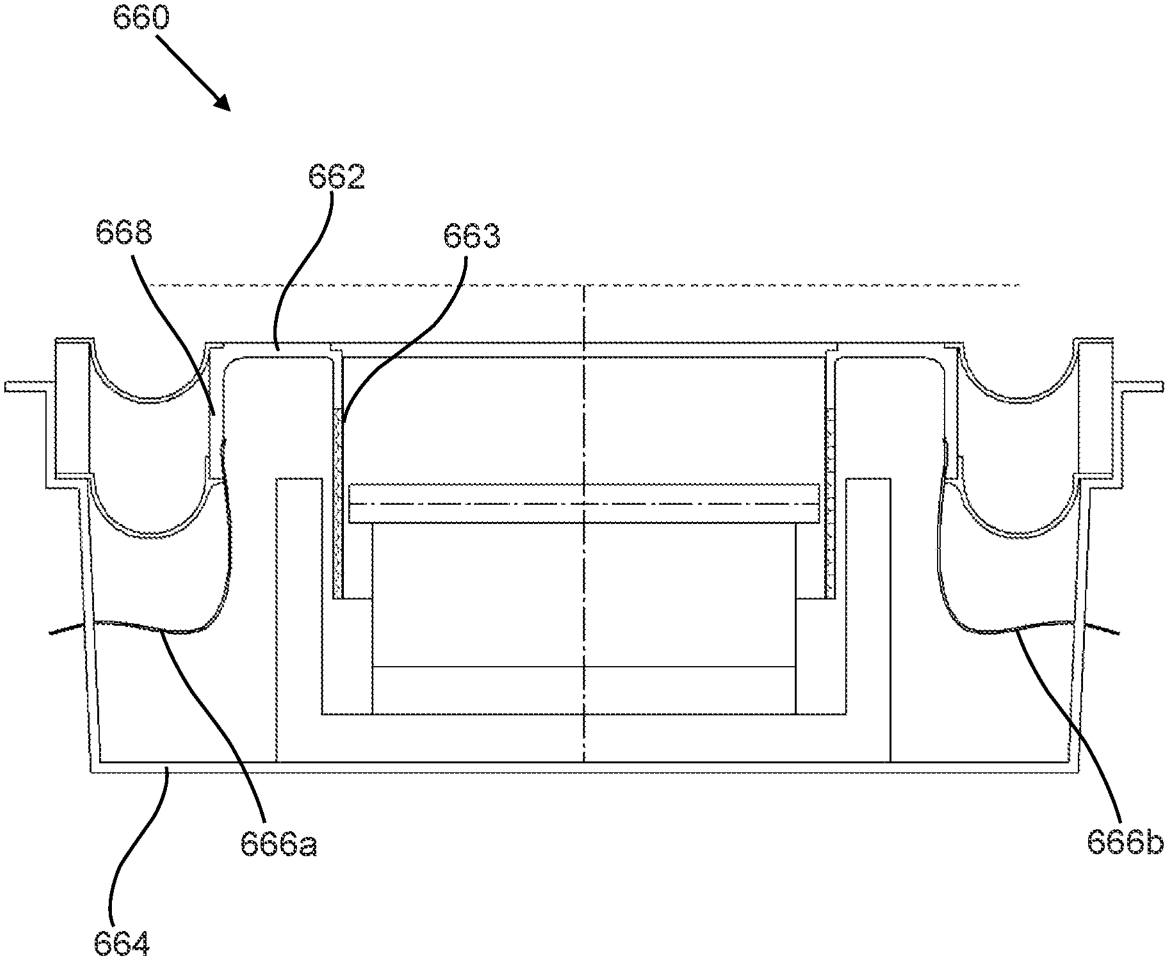
FIG. 6 shows a cross-sectional side view of a loudspeaker transducer according to embodiments of the present disclosure.

FIG. 6 shows a cross-section side view of a loudspeaker transducer 660 according to embodiments of the present disclosure. In embodiments, loudspeaker transducer 660 comprises a frame 664, a diaphragm 662, a voice coil 663, a first wire connection 666*a* and a second wire connection 666*b*. First wire connection 666*a* passes through a hole in frame 664 and attaches to an inward turning portion 668 of diaphragm 662. First wire connection 666*a* is threaded through diaphragm 662 to reach voice coil 663. Second wire connection 666*b* passes from voice coil 663, through diaphragm 662, and out through a hole in frame 664. First wire connection 666*a* and second wire connection 666*b* allow loudspeaker transducer 660 to be supplied with electrical input.

Figure 7:
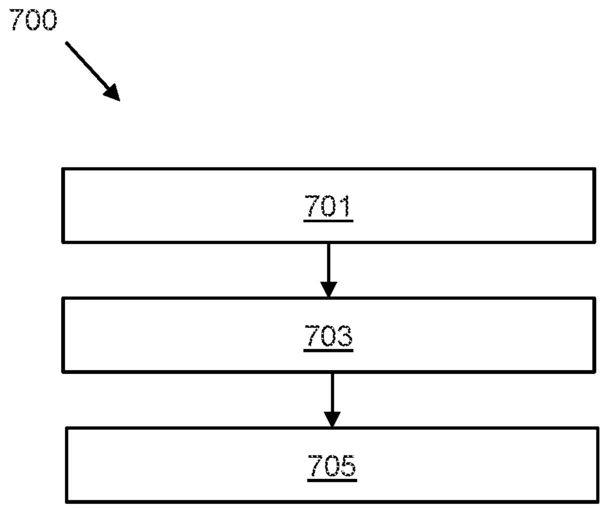
FIG. 7 is a flow chart for methods of manufacture of a loudspeaker transducer according to embodiments of the present disclosure.

FIG. 7 shows a method of manufacturing a loudspeaker transducer according to embodiments of the present disclosure. Embodiments comprise a method of manufacturing a loudspeaker transducer comprising a diaphragm, a frame, an inner suspension element and an outer suspensions element, the method comprising forming the diaphragm with a portion turning inwards towards the frame 701, and attaching the inner suspension element to the frame and the inward turning portion at an outer end of the diaphragm 703. The inner suspension element is attached to the frame and the diaphragm such that it is further away than the outer suspension element to the main opening of the frame through which the loudspeaker transducer radiates sound.

Figure 8:
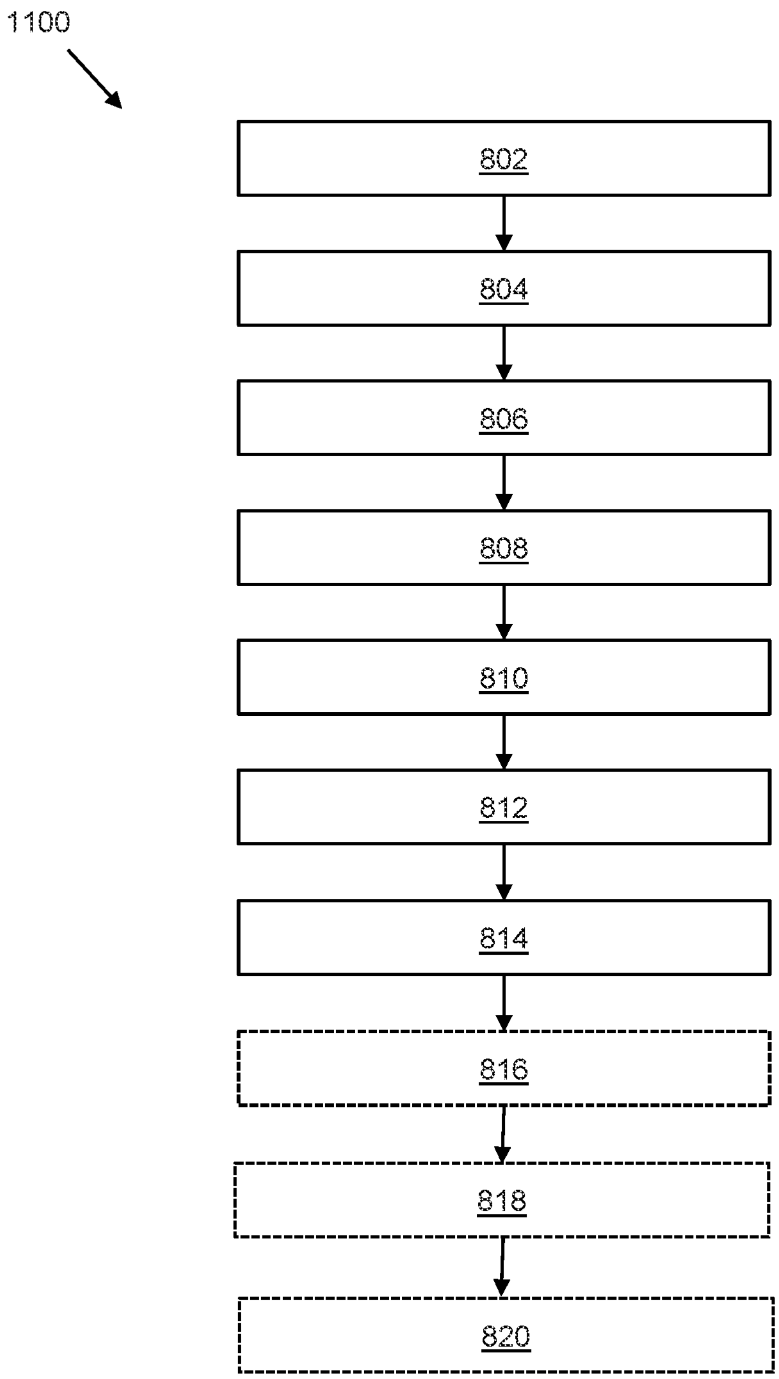
FIG. 8 is a flow chart for methods of manufacture of a loudspeaker transducer according to embodiments of the present disclosure.

FIG. 8 shows a method of manufacturing a loudspeaker transducer according to embodiments of the present disclosure. Embodiments comprise a method of manufacturing a loudspeaker transducer comprising: forming a diaphragm 802; forming a first frame part 804; forming a suspension element 806; forming a second frame part 808; attaching a suspension element to the first frame part 810; attaching the diaphragm to the suspension element 812. The diaphragm comprises an inward turning portion which turns inwards towards the first frame part and the suspension element attaches to the inward turning portion at an outer end of the diaphragm. Attaching the second frame part to the first frame part 814. Forming the loudspeaker transducer from a first frame part and a second frame part allows the loudspeaker transducer to be manufactured and assembled more easily than with a single frame. In embodiments, the method comprises forming a further suspension element 816; attaching the further suspension element to the second frame part 818; and attaching the further suspension element to the diaphragm 820.

Embodiments comprise a method of assembling a loudspeaker transducer comprising: attaching a suspension element to a first frame part; attaching a diaphragm to the suspension element, wherein the diaphragm comprises an inward turning portion which turns inwards towards the first frame part; and attaching a second frame part to the first frame part. In embodiments, the method of assembling a loudspeaker transducer comprises attaching a further suspension element to the second frame part and attaching the further suspension element to the diaphragm.

Figure 9:
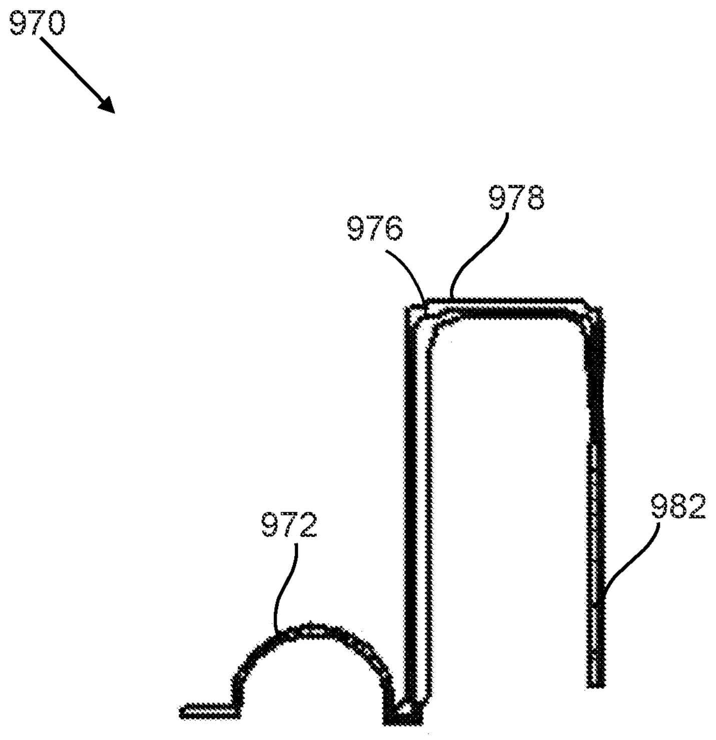
FIG. 9 shows a cross-sectional side view of components of a loudspeaker transducer during assembly according to embodiments of the present disclosure.

FIG. 9 shows a cross-sectional side view of components 970 of a loudspeaker transducer according to embodiments of the present disclosure. Components 970 comprise a suspension element 972, a diaphragm 978, a voice coil 982 and a wire connection 976. Wire connection 976 passes through a channel in suspension element 972, and passes through a channel in diaphragm 978 in order to connect to voice coil 982.

Figure 10:
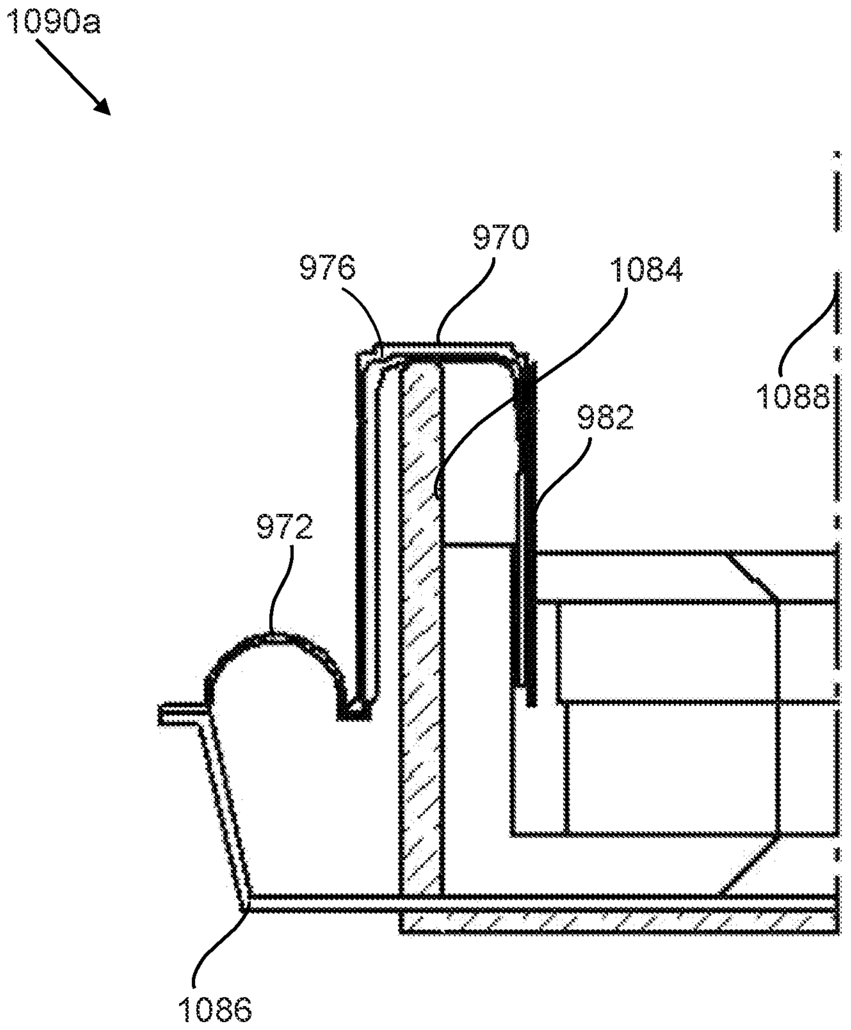
FIG. 10 shows a cross-sectional side view of components of a loudspeaker transducer during assembly according to embodiments of the present disclosure.

FIG. 10 shows a cross-sectional side view of components 1090*a* of a loudspeaker transducer during assembly according to embodiments of the present disclosure. Components 1090*a* comprise suspension element 972, diaphragm 978, voice coil 982 and wire connection 976 and also include a first frame part 1086 and a support element 1084. A central axis 1088 runs through the centre of the loudspeaker transducer. FIG. 10 shows the loudspeaker transducer during manufacturing once the method steps of attaching suspension element 972 to first frame part 1086 (corresponding to 810 in FIG. 8) and attaching diaphragm 978 to suspension element 972 (corresponding to 812 in FIG. 8) have been carried out.

Figure 11:
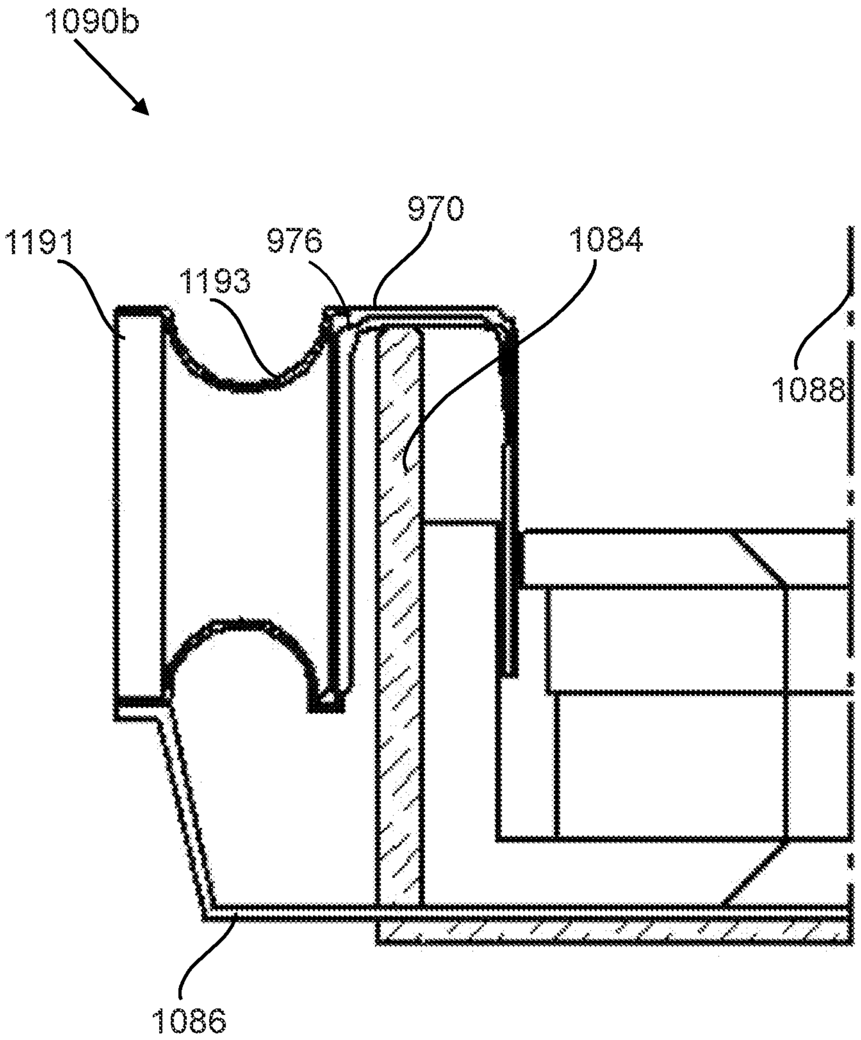
FIG. 11 shows a cross-sectional side view of components of a loudspeaker transducer during assembly according to embodiments of the present disclosure.

FIG. 11 shows a cross-sectional side view of components 1090*b*, including components 1090*a* shown in FIG. 10, a second frame part 1191 and a further suspension element 1193. FIG. 11 shows the loudspeaker transducer during manufacturing once the method steps of attaching second frame part 1191 to first frame part 1086 (corresponding to 814 in FIG. 8), attaching further suspension element 1193 to second frame part 1191 (corresponding to 818 in FIG. 8), and attaching further suspension element 1193 to diaphragm 978 (corresponding to 1129 in FIG. 8) have been carried out.

Figure 12:
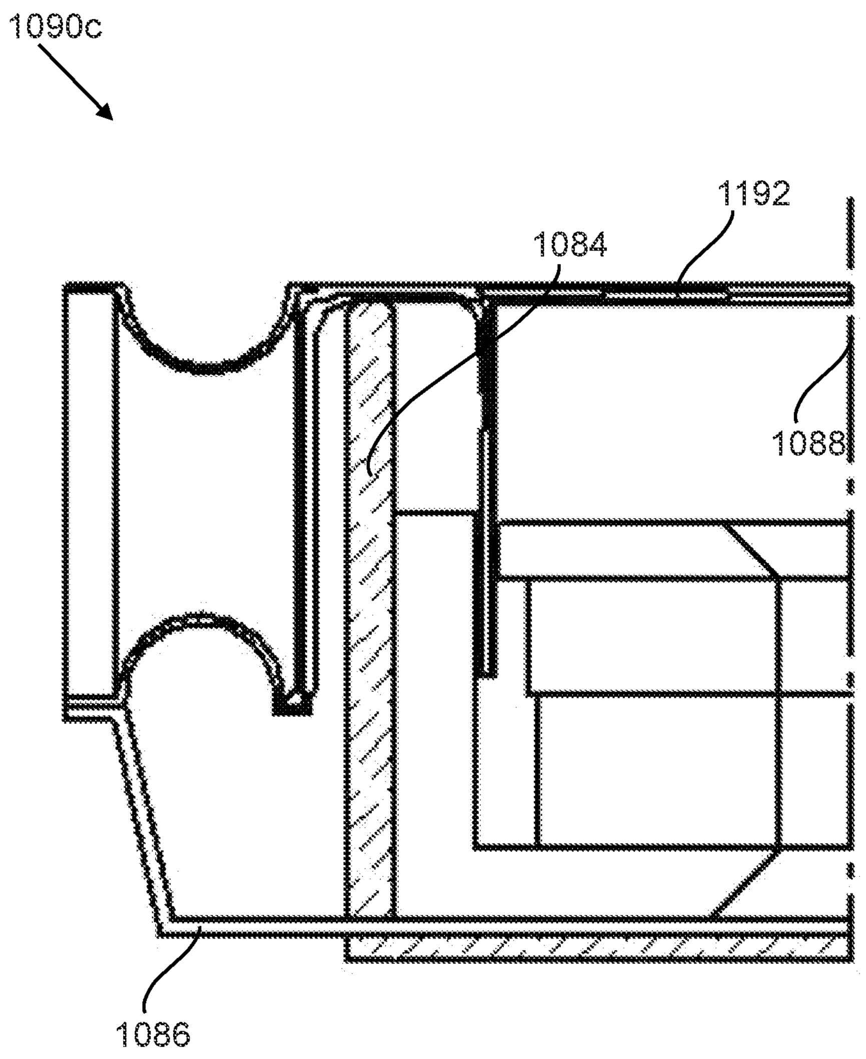
FIG. 12 shows a cross-sectional side view of components of a loudspeaker transducer during assembly according to embodiments of the present disclosure.

FIG. 12 shows a cross-sectional side view of components 1090*c*, including components 1090*b* shown in FIG. 11 and a dust cap 1192. FIG. 12 shows the loudspeaker transducer during manufacturing once the step of attaching dust cap 1192 to diaphragm 978 has been carried out.

Figure 13:
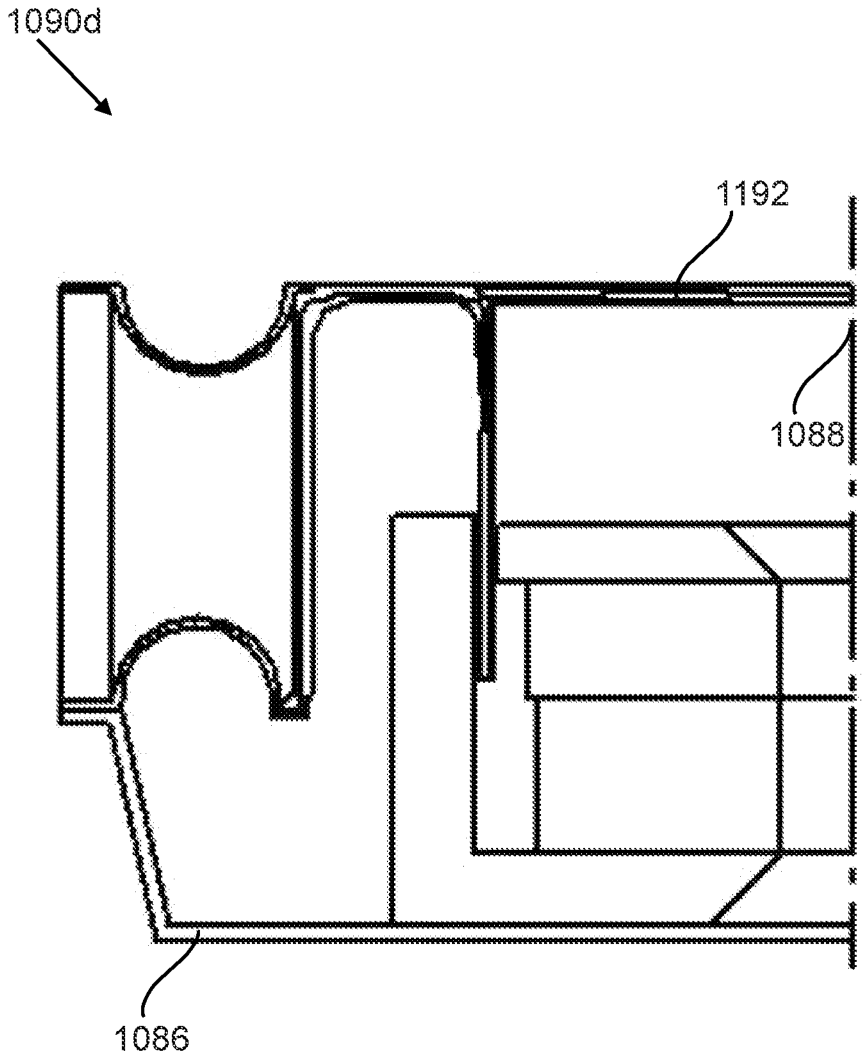
FIG. 13 shows a cross-sectional side view of components of a loudspeaker transducer during assembly according to embodiments of the present disclosure.

FIG. 13 shows a cross-sectional side view of components 1090*d*, including components 1090*c* shown in FIG. 12 but with support element 1084 removed. Support element 1084 is an additional element which is used temporarily during the manufacturing/assembly process to facilitate more efficient manufacture/assembly. FIG. 13 shows the loudspeaker transducer once manufacturing/assembly has been completed.

Whilst the present disclosure has been described and illustrated with reference to particular embodiments, it will be appreciated by those of ordinary skill in the art that the present disclosure lends itself to many different variations not specifically illustrated herein. By way of example only, certain possible variations will now be described.

In embodiments, suspension element 972 comprises an inner suspension element (for example inner suspension element 118) and further suspension element 1193 comprises an outer suspension element (for example outer suspension element 110), where the outer suspension element is located closer than the inner suspension element to the main opening of the frame through which the loudspeaker transducer radiates sound.

In alternative embodiments, loudspeaker transducer 100 comprises a rounded shape. In other embodiments, loudspeaker transducer 100 comprises a square shape.

In alternative embodiments, loudspeaker transducer 100 comprises one or more of an ovular shape, an elliptical shape, and a rectangular shape.

In some embodiments, the diaphragm has an inward turning portion that is curved. In other embodiments, the diaphragm has an inward turning portion that is diagonal in relation to a central axis of the loudspeaker transducer.

In embodiments, the diaphragm has one or more holes which reduce the mass of the diaphragm. In embodiments, the diaphragm has one or more cut-outs which reduce the mass of the diaphragm. In embodiments, the dust cap has one or more holes which reduce the mass of the dust cap.

In embodiments, the diaphragm is ribbed. The ribs provide increased stiffness to the diaphragm. In embodiments, the diaphragm has one or more bracing elements. The bracing elements provide increased stiffness to the diaphragm.

In embodiments, suspension elements 118 and/or 110 are flexible enough to have a desired resonant frequency, and stiff enough to provide stability to the diaphragm.

In embodiments, suspension elements 118 and/or 110 are made from rubber, this allows the suspension elements to be flexible enough to have a required resonant frequency and to be stiff enough to provide stability to the diaphragm.

In embodiments, the diaphragm and dust cap are molded from plastic. In embodiments, the diaphragm and dust cap are cast from metal. In embodiments, the diaphragm and dust cap are cast from aluminum. In embodiments, the diaphragm and dust cap are machined out of a block of material.

In embodiments, a suspension element is connected at any location on the outer surface of the diaphragm.

Where in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the present disclosure that are described as preferable, advantageous, convenient or the like are optional and do not limit the scope of the independent claims. Moreover, it is to be understood that such optional integers or features, whilst of possible benefit in some embodiments of the present disclosure, may not be desirable, and may therefore be absent, in other embodiments.

What is claimed is:

1. A loudspeaker transducer comprising a diaphragm, a frame, an inner suspension element and an outer suspension element, wherein:

the diaphragm comprises a portion turning inwards towards the frame, and an inner portion comprising an inner end of the diaphragm, the inner portion turning inwards towards the frame, the inner portion parallel to the inward turning portion, the outer suspension element is located closer than the inner suspension element to the main opening of the frame through which the loudspeaker transducer radiates sound, the inner suspension element is connected to the frame and the inward turning portion, and the inner suspension element is connected to the inward turning portion at an outer end of the diaphragm.

2. The loudspeaker transducer of claim 1, wherein a length of the inward turning portion is dependent upon a desired excursion parameter of the loudspeaker transducer.

3. The loudspeaker transducer of claim 1, wherein a length of the inward turning portion is dependent upon a desired depth of the loudspeaker transducer.

4. The loudspeaker transducer of claim 1, wherein the inner suspension element is continuously connected to the inward turning portion along an entire outer end of the diaphragm.

5. The loudspeaker transducer of claim 1, wherein the inner suspension element is discontinuously connected to the inward turning portion at one or more parts of an outer end of the diaphragm.

6. The loudspeaker transducer of claim 1, comprising a voice coil, wherein the voice coil is not connected to the inner suspension element.

7. The loudspeaker transducer of claim 1, comprising a voice coil, wherein the voice coil is connected to the inner end of the diaphragm.

8. The loudspeaker transducer of claim 1, comprising a magnet structure, wherein the inward turning portion overlaps outside a perimeter of the magnet structure with at least part of the height of the magnet structure.

9. The loudspeaker transducer of claim 1, comprising a magnet structure, wherein the diaphragm comprises a further portion parallel to a top surface of the magnet structure.

10. The loudspeaker transducer of claim 9, wherein the inward turning portion is perpendicular to the further portion.

11. The loudspeaker transducer of claim 9, wherein the inward turning portion is connected to the further portion at an outer edge of the diaphragm.

12. The loudspeaker transducer of claim 1, comprising a further suspension element connected to the frame and the diaphragm.

13. The loudspeaker transducer of claim 9, comprising a further suspension element connected to the frame and the diaphragm, wherein the further suspension element is connected to an outer edge of the further portion of the diaphragm.

14. The loudspeaker transducer of claim 1, wherein the inner suspension element comprises a surface with at least one perforation.

15. A method of manufacturing a loudspeaker transducer comprising a diaphragm, a frame, an inner suspension element and an outer suspension element, the method comprising:

forming the diaphragm with a portion turning inwards towards the frame and an inner portion comprising an inner end of the diaphragm, the inner portion turning inwards towards the frame, the inner portion parallel to the inward turning portion; and attaching the inner suspension element to the frame and the inward turning portion at an outer end of the diaphragm, wherein the inner suspension element is attached to the frame and the diaphragm such that it is further away than the outer suspension element to the main opening of the frame through which the loudspeaker transducer radiates sound.

16. A method of manufacturing a loudspeaker transducer, the method comprising: forming a diaphragm; forming a first frame part; forming a suspension element; forming a second frame part; attaching a suspension element to the first frame part; attaching the diaphragm to the suspension element, wherein the diaphragm comprises an inward turning portion which turns inwards towards the first frame part, and an inner portion comprising an inner end of the diaphragm, the inner portion turning inwards towards the first frame part, the inner portion parallel to the inward turning portion; and the suspension element attaches to the inward turning portion at an outer end of the diaphragm; and attaching the second frame part to the first frame part.

17. The method of claim 16, the method comprising:

forming a further suspension element;

attaching the further suspension element to the second frame part; and attaching the further suspension element to the diaphragm.

* * * * *